(12) United States Patent
Bošanský et al.

(10) Patent No.: US 12,547,713 B2
(45) Date of Patent: Feb. 10, 2026

(54) PREDICTING FUTURE MALWARE WITH GENERATIVE MODELS

(71) Applicant: Avast Software s.r.o., Prague (CZ)

(72) Inventors: Branislav Bošanský, Banska Bystrica (SK); Viliam Lisý, Svaty Jur (SK); Michal Najman, Vsetín (CZ); Lada Hospodková, Přelouč (CZ)

(73) Assignee: Avast Software s.r.o., Prague (CZ)

( * ) Notice: Subject to any disclaimer, the term of this patent is extended or adjusted under 35 U.S.C. 154(b) by 491 days.

(21) Appl. No.: 17/511,305

(22) Filed: Oct. 26, 2021

(65) Prior Publication Data

US 2023/0130651 A1    Apr. 27, 2023

(51) Int. Cl.
  *G06F 21/56* (2013.01)
  *G06N 3/045* (2023.01)

(52) U.S. Cl.
  CPC .......... *G06F 21/562* (2013.01); *G06N 3/045* (2023.01); *G06F 2221/033* (2013.01)

(58) Field of Classification Search
  CPC .................. G06F 21/562; G06F 2221/033
  See application file for complete search history.

(56) References Cited

U.S. PATENT DOCUMENTS

| | | | | |
|---|---|---|---|---|
| 11,595,437 | B1* | 2/2023 | Mushtaq | H04L 63/1483 |
| 2019/0199736 | A1* | 6/2019 | Howard | H04L 63/1425 |
| 2019/0260775 | A1* | 8/2019 | Bartos | G06F 21/564 |
| 2020/0045063 | A1* | 2/2020 | Zhang | H04L 63/1416 |
| 2021/0099474 | A1* | 4/2021 | Huang | G06N 3/088 |
| 2021/0144154 | A1* | 5/2021 | Levy | H04L 63/1416 |
| 2022/0253526 | A1* | 8/2022 | Sanders | G06F 21/566 |
| 2022/0269949 | A1* | 8/2022 | Scheideler | G06N 3/045 |

OTHER PUBLICATIONS

Mitre Att&ck https://web.archive.org/web/20210217002348/https://attack.mitre.org/ Feb. 17, 2021 (Year: 2021).*
Castro et al. Poster: Training GANs to Generate Adversarial Examples Against Malware Classification 40th IEEE Symposium on Security and Privacy May 20-22, 2019 (Year: 2019).*

(Continued)

*Primary Examiner* — David J Pearson
(74) *Attorney, Agent, or Firm* — AVEK IP, LLC; Mark C. Young

(57) ABSTRACT

A malware classification system includes a first machine-learning model trained based on malware from a first plurality of prior time periods to predict malware in a first subsequent time period subsequent to the first plurality of prior time periods, and a second machine-learning model is trained based on malware from a second plurality of prior time periods offset by at least some time from the plurality of time periods used to train the first machine-learning model to predict malware in a second subsequent time period subsequent to the second plurality of prior time periods. The trained first and second machine-learning models are used to predict malware in a future time period, and a classifier is trained using the malware from a plurality of the prior time periods and predicted malware from a future time period to train the classifier to identify and/or classify malware.

17 Claims, 5 Drawing Sheets

(56) References Cited

OTHER PUBLICATIONS

M. Bruckner, C. Kanzow, and T. Scheffer. "Static Prediction Games For Adversarial Learning Problems," Journal of Machine Learning Research, vol. 13, No. Sep, pp. 2617-2654, 2012.

Colbaugh, Richard and K. Glass. "Predictive Defense Against Evolving Adversaries," in IEEE International Conference on Intelligence and Security Informatics. IEEE, 2012, pp. 18-23.

Y. Kim, S. J. Bu, and S. B. Cho. "Zero-day Malware Detection Using Transferred Generative Adversarial Networks Based On Deep Autoencoders," Information Sciences, vol. 460-461, pp. 83-102, 2018.

J. Y. Kimand, S. B. Cho. "Detecting Intrusive Malware with a Hybrid Generative Deep Learning Model." Springer International Publishing, 2018, vol. 11314, LNCS.

Y. Lu and J. Li. "Generative Adversarial Network for Improving Deep Learning Based Malware Classification," Proceedings—Winter Simulation Conference, vol. Dec. 2019, pp. 584-593, 2019.

\* cited by examiner

PREDICTING FUTURE MALWARE WITH GENERATIVE MODELS

FIELD

The invention relates generally to security in computerized systems, and more specifically to predicting future malware with generative models.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

All of these methods for detecting malware rely on being able to recognize and characterize malicious code, which is constantly evolving. Many common malware programs are intentionally modified over time to avoid being detected by existing tools, and new malware threats are constantly replacing old ones. With new threats constantly emerging, efficient and timely detection of vulnerabilities within a computer network remain a significant challenge. Further, understanding the evolution of a family of malware can be difficult given the number of features and variations present in many modern sophisticated malware families. It is therefore desirable to be able to compensate for the evolution of malware threats in computerized systems to help understand the threats being faced and provide efficient detection of vulnerabilities.

SUMMARY

One example embodiment of the invention comprises a method of operating a malware evaluation system in which a first machine-learning model is trained based on malware from a first plurality of prior time periods to predict malware in a first subsequent time period subsequent to the first plurality of prior time periods, and a second machine-learning model is trained based on malware from a second plurality of prior time periods offset by at least some time from the plurality of time periods used to train the first machine-learning model. The second machine-learning model is similarly trained to predict malware in a second subsequent time period subsequent to the second plurality of prior time periods. Additional machine-learning models are similarly trained to predict malware in further subsequent time periods.

In a further example, the trained first, second, and additional machine-learning models are used to predict malware in a future time period, and a classifier is trained using the malware from a plurality of the prior time periods and predicted malware from a future time period to train the classifier to identify and/or classify malware.

The details of one or more examples of the invention are set forth in the accompanying drawings and the description below. Other features and advantages will be apparent from the description and drawings, and from the claims.

DETAILED DESCRIPTION

Figure 1:
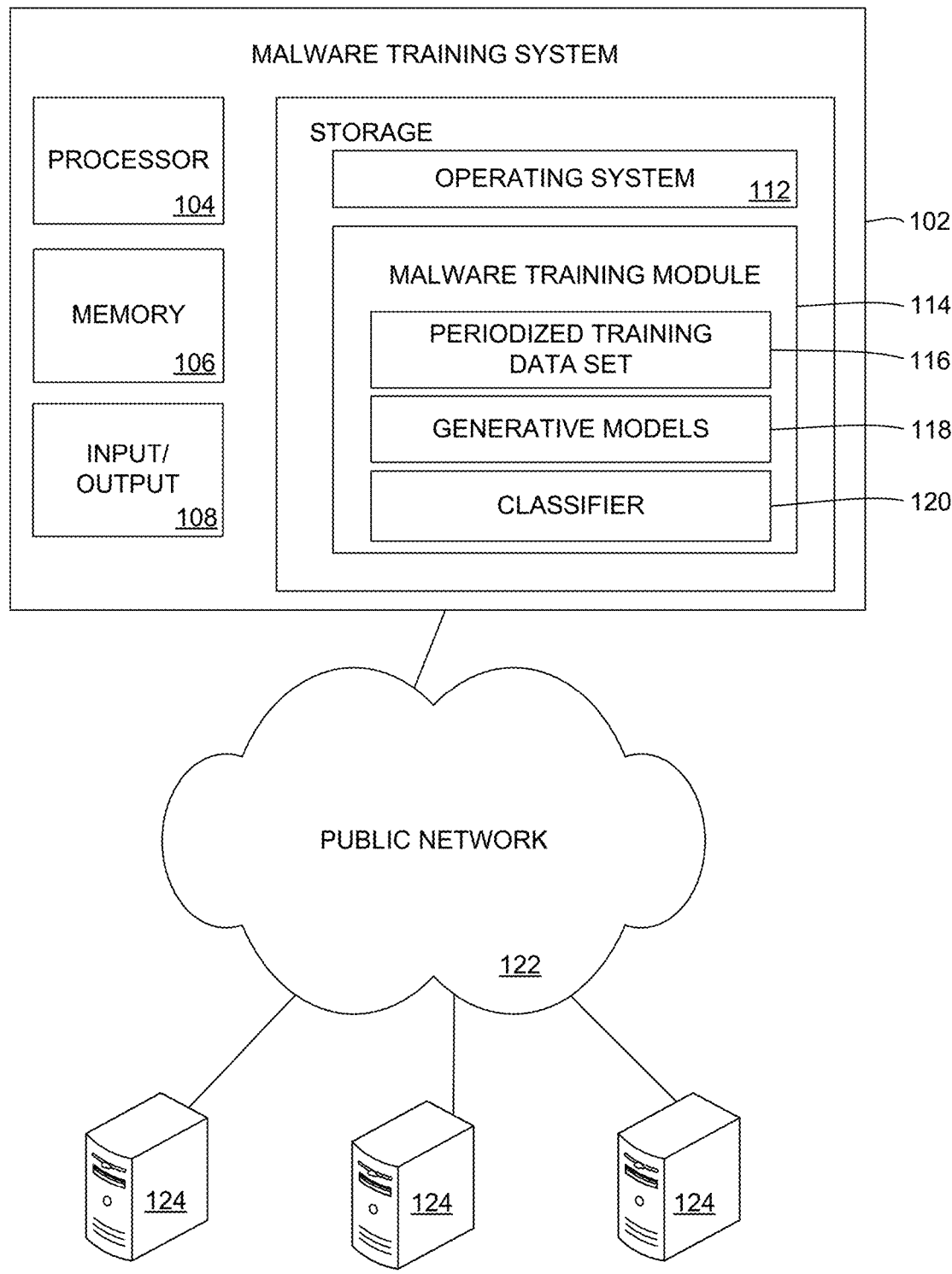
FIG. 1 shows an example malware detection system, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java™ applets, and other such common files are all frequently infected with malware of various types, and users rely on tools such as antivirus software or other malware protection tools to protect their computerized devices from harm.

In a typical home computer or corporate environment, firewalls inspect and restrict the types of communication that can occur between local devices such as computers or IoT devices and the Internet, antivirus programs prevent known malicious files from being loaded or executed on a computer system, and malware detection programs detect known malicious code such as remailers, keystroke loggers, and other software that is designed to perform undesired operations such as stealing information from a computer or using the computer for unintended purposes. But, with new threats constantly emerging, efficient and timely detection and classification of vulnerabilities within computerized systems and IoT devices such as a home appliance remain a significant challenge. New anti-malware algorithms, artificial intelligence networks or systems, and other such solutions are therefore constantly under development.

Machine learning tools such as neural networks are often used to analyze and classify potential new threats, with varying degrees of success. Some machine learning or artificial intelligence models such as Bayesian networks use decision trees and probabilities or statistics to make determinations, while other more sophisticated systems use neural networks designed to mimic human brain function. But, as malware creators develop and implement new ways of evading detection by antimalware tools, anticipating and detecting the features of newly-evolving malware becomes increasingly difficult.

Even sophisticated machine-learning models can suffer from "concept drift," as the data distribution between known malware used for training and newly-evolving malware grows to be different. New versions of compilers or supporting libraries, new code fragments or techniques, and similar changes affect the formal representation of data that is processed by the machine-learning model to make a malware determination, and can appear in many domains where machine-learning models are applied. Because the reasons for this concept drift phenomenon vary significantly and are not easily anticipated, compensating for them in building antimalware tools is a significant challenge. Frequent retraining of machine-learning models using the most up-to-date known malware data sets is the common solution, but often does not protect against malware that is evolving in significant or rapid fashion.

For reasons such as these, some examples presented herein provide machine learning models that anticipate the evolution of malware based on prior observed evolution. In one such example, a first machine-learning model is trained based on malware from a first plurality of prior time periods to predict malware in a first time period subsequent to the first plurality of prior time periods. A second machine-learning model is similarly trained based on malware from a second plurality of prior time periods offset by at least some time from the plurality of time periods used to train the first machine-learning model, the second machine-learning model trained to predict malware in a second time period subsequent to the second plurality of prior time periods. Additional machine-learning models are similarly trained to predict malware in further subsequent time periods.

The trained first, second, and additional machine-learning models are then used to predict malware in a future time period, and training a classifier using the malware from a plurality of the prior time periods and predicted malware from a future time period to train the classifier to identify and/or classify malware, including future or evolving malware. The machine learning models in a further example are generative models, such as conditional cyclic generative adversarial networks (CCyGAN). The trained machine learning models and classifier can then be deployed as part of a malware evaluation system to identify and/or classify malware, including future malware.

FIG. 1 shows an example malware detection system, consistent with an example embodiment. Here, a network device such as malware training system 102 comprises a processor 104, memory 106, input/output elements 108, and storage 110. Storage 110 includes an operating system 112, and a malware training module 114 that is operable to train a machine-learning system to detect malware. The malware training module 114 includes in this example a set of training data 116 that is periodized, such that it can be used in training to represent different time periods of observed malware and clean software. The periodized training set is used to train one or more generative models to use a first set of prior periodized training data sets to predict a future periodized training data set. For example, a generative model may use five sequential months' worth of periodized data, such that the first four periodized monthly training data sets are used to predict the fifth, final training data set. The generative models 118 are therefore trained to use prior malware data sets and changes between time-sequential data sets to predict a future malware/clean data set. Finally, classifier 120 receives the output from the generative models 118, and uses the output to classify the data under test as likely benign or potentially malicious.

Once a trained set of generative models and classifier are derived in the malware training system 102, they may be distributed as part of an antimalware module to end user computers 124, or may be used on a backend/cloud portion of the antivirus and/or antimalware system. The end user computers 124 install the antimalware module, or use the cloud-based antivirus and/or antimalware system, which uses the generative models and classifier to evaluate files and other data for malware, selectively blocking execution, quarantining, and/or notifying a user of suspected malware.

In a more detailed example, the periodized training data set 116 is broken up into suitable time periods, such as weeks or months, over which the training data in the data set was observed. For example, malware observed "in the wild" only for a period of a few weeks will only appear in the month or weeks of corresponding periodized data. These periodized subsets of the training data set are then fed to a generative model 118, such as a generative adversarial network or Conditional Cyclic Generative Adversarial Network (CCyGAN) along with the periodization data such that the generative model learns the progression of malware over time. This process is repeated for different time periods, such as ending each new generative model with a successive time period such as the next week, month, or the like. The training data in various examples comprises static features of files or data (such as code sequences, API (Application Programming Interface) or library calls, and/or permissions), behavioral features (such as what executable code in a file does or how it interacts with other data or parts of the computer), or a combination of such features.

Once a group of generative models 118 are assembled, the generative models are used to predict malware one or more time periods into the future, which are incorporated along with historic data in training the classifier 120. The classifier therefore embodies both the historic periodized training data 116 and future or predicted malware data as generated by the generative models 118, enhancing its ability to detect malware not yet seen in the wild.

Figure 2:
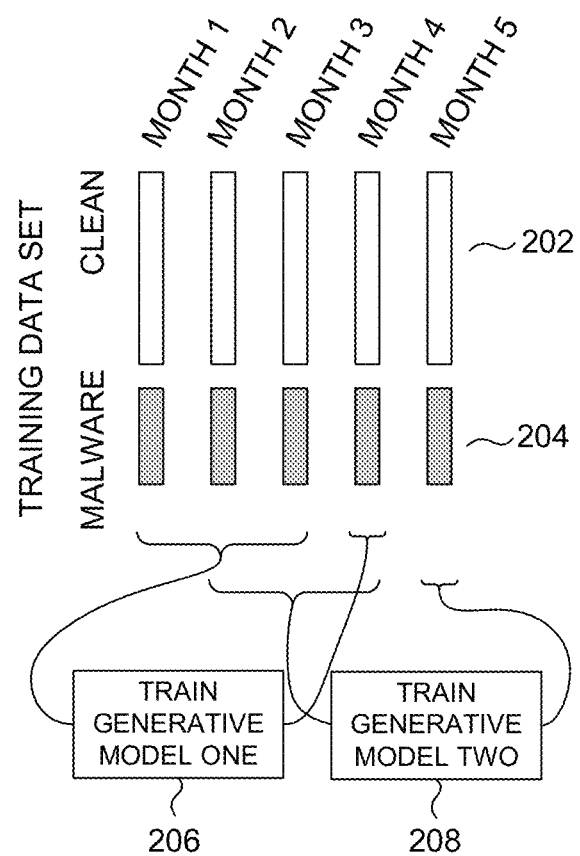
FIG. 2 is a block diagram showing training generative models, consistent with an example embodiment.

FIG. 2 is a block diagram showing training generative models, consistent with an example embodiment. Here, a training data set includes periodized data observed in the wild over five months, including both clean files 202 that are not malicious and malware 204 that has been determined to be malicious. Training data from the first three months are then used to train generative model one, shown at 206, to be able to properly predict malware from month four. Similarly, training data from months two through four are used to train generative model two to properly predict future malware from month five, using both the months two through four and month five data as training inputs. In other examples, a greater (or fewer) number of months will be included in the training data, such as the prior six months, prior year, or the like, and/or other periods of time such as weeks or years will be employed.

The training data set's clean training data 202 and malware training data 204 are in various examples static data, behavioral data, a combination of static and behavioral data, and/or other such data regarding the subject data (such as files or executables) being evaluated. Static data in some examples includes actual code sequences, API (Application Programming Interface) or library calls, and/or application permissions, and the like, while behavioral features typically include a characterization of what executable code in a file does or how it interacts with other data or parts of the computer. For example, a ransomware malware executable may call a library that performs encryption functions as a static feature, and may be observed to modify a large number of arbitrary files on the computer as a behavioral feature.

The result of the process shown in FIG. 2 is that multiple generative models will be trained to predict future malware from past observed malware, each of the multiple generative models trained over a different (but possibly overlapping) time period. This enables each of the different generative models to capture and represent a different time period in evolution of malware, such that the generative models can be used to predict future malware based on a variety of different patterns in past malware evolution. In a more detailed example, the generative models are adversarial generative models, such as Conditional Cyclic Generative Adversarial Networks (CCyGANs), or similar machine-learning networks.

Figure 3:
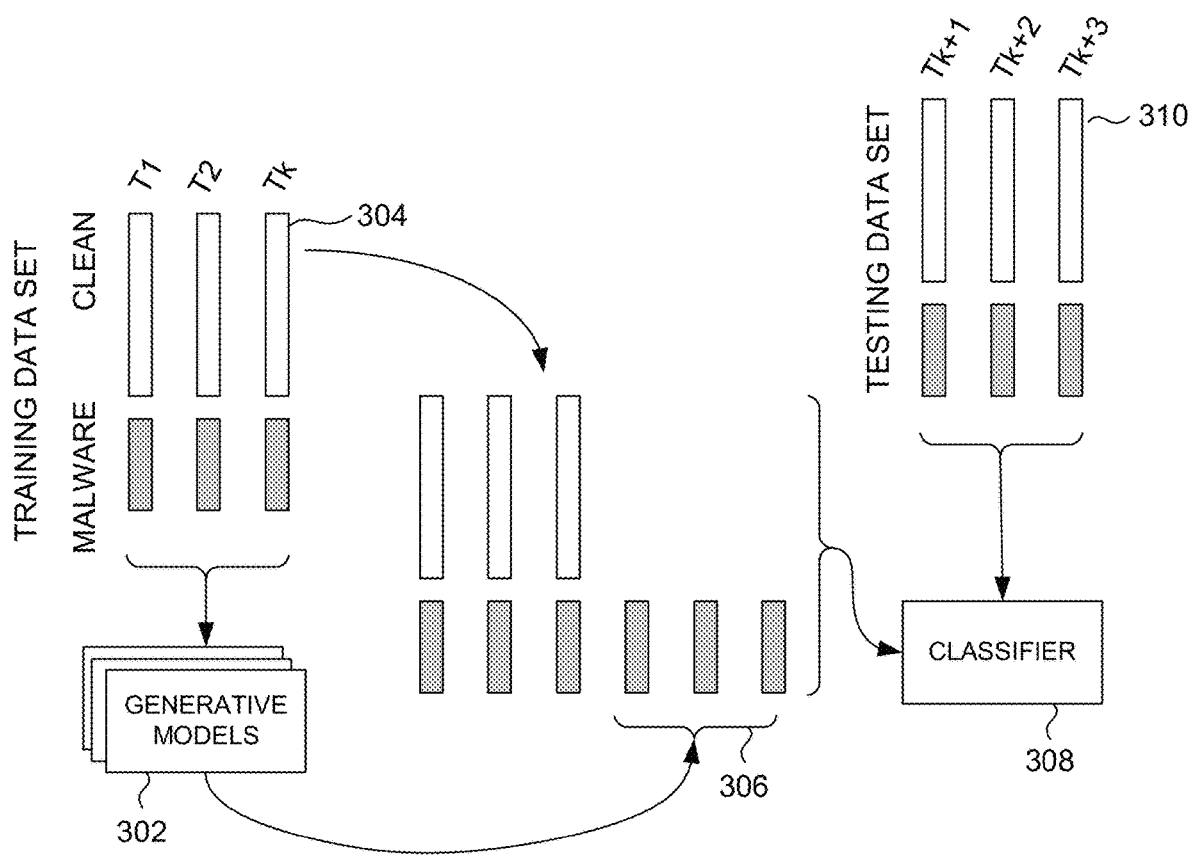
FIG. 3 is a block diagram showing training a classifier with trained generative models, consistent with an example embodiment

FIG. 3 is a block diagram showing training a classifier with trained generative models, consistent with an example embodiment. Here, trained generative models 302 such as are produced using the example of FIG. 2 are applied to a training data set 304 to produce a set of predicted future malware 306. This predicted future malware is based on the evolution of malware observed in training data set 304, as evaluated by the trained generative models 302. The predicted future malware 306, along with the training data set 304, are then used to train the classifier 308 to detect and classify both known or current malware and future malware based on the predictions generated by generative models 302.

In a further example, testing data set 310 comprises clean and malware data from one or more time periods beyond the training data set 304, such that the performance of classifier 308 in detecting future malware can be characterized or evaluated. In one such test similar to that represented in FIG. 3, the method was evaluated using two data sets—a publicly available Ember data set and an internal data set created from Windows portable executable files. For each data set, 20 malware families were selected as exhibiting the most significant changes in data distributions according to maximum mean discrepancy statistics. When evaluating performance of generative models built from such data at generating predicted future malware 306 that corresponds to actual observed future malware as seen in testing data set 310, the statistical F-score on accurate detection of malware improved from 2%-10% depending on the time period and data set being evaluated. This demonstrates that using generative models to train a classifier to detect predicted or future malware can statistically meaningfully improve the performance of the classifier in detecting emerging malware threats.

Figure 4:
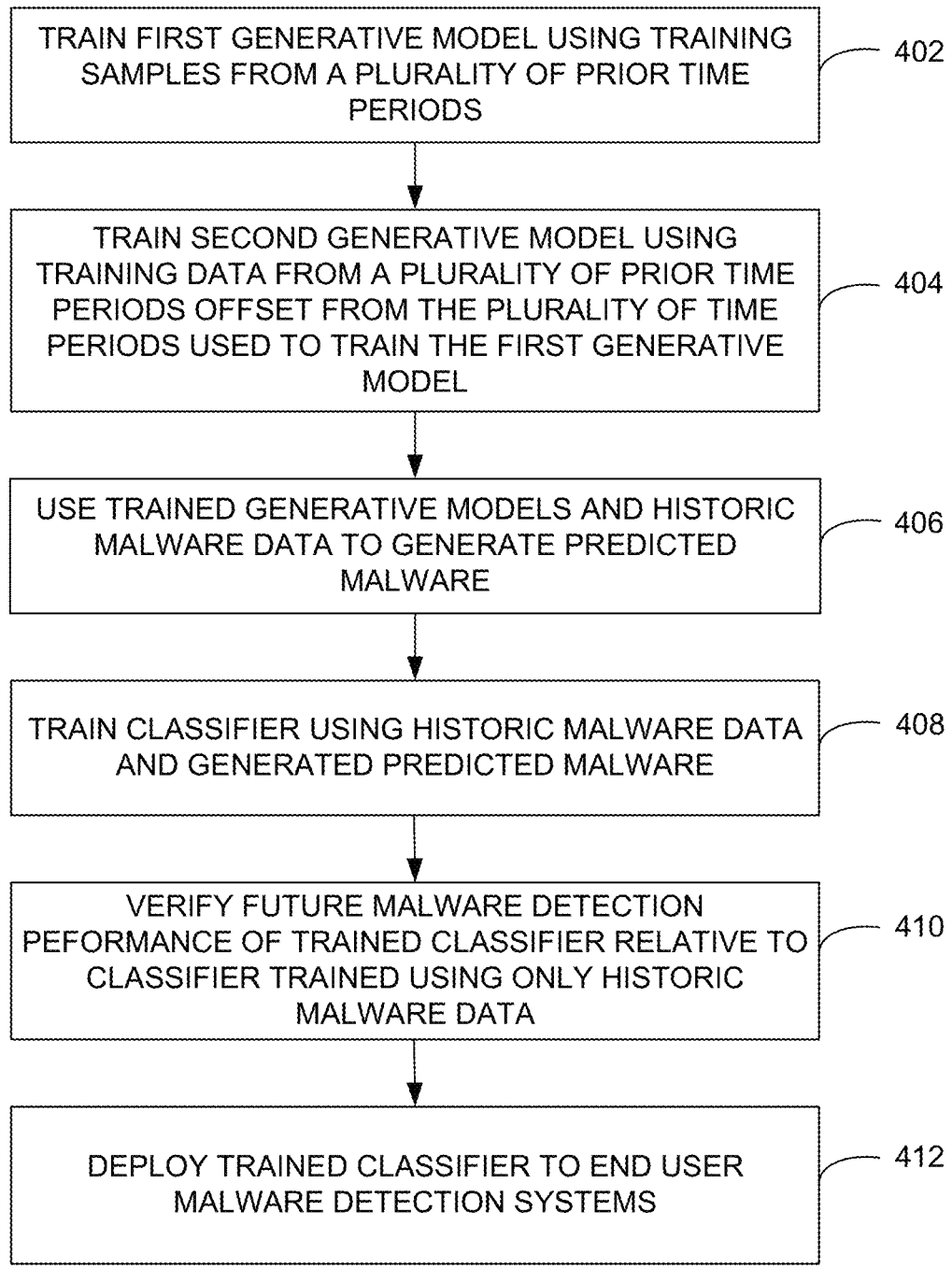
FIG. 4 is a flowchart of using trained generative models to train a classifier to detect future malware, consistent with an example embodiment.

FIG. 4 is a flowchart of using trained generative models to train a classifier to detect future malware, consistent with an example embodiment. At 402, a first generative model such as a Conditional Cyclic Generative Adversarial Network is trained using both historic data from various sequential time periods as inputs and data from a sequential subsequent time period as a desired output. The time periods in various examples are selected to reflect some evolution of malware observed between time periods, such as weeks, months, or the like. At 404, at least a second generative model is trained using training data from another plurality of time periods, offset from the first plurality of time periods. The periods overlap in some embodiments, such as each period ending on a time period offset from one time period by other generative models being trained.

The trained generative models are use at 406 to analyze recent period malware and clean file data, and to predict future malware based on their training. A classifier is then trained to recognize not only the recent period malware, but also the predicted future malware at 408. This classifier is tested or verified at 410, such as by using future malware as it evolves or using a training data set from the past in which "future" malware is already known. This enables comparison of the performance of the trained classifier in detecting future malware relative to a classifier that does not have the benefit of training with predicted future malware using the outputs of trained generative models.

At 412, the trained classifier is deployed to end-user malware detection systems, with improved capability to detect and classify malware that had not yet been observed in the wild at the time the classifier was trained and deployed. Examples include anti-malware software executing on personal computers, servers, network devices, smart phones, and the like.

The examples presented herein show how the process of classifying new files as malware can be improved by using generative models to predict new malware to be incorporated in the training process. In some example embodiments, the systems, methods, and techniques described herein are performed on one or more computerized systems. Such computerized systems are able in various examples to perform the recited functions such as collecting file data, generative models from the file data, predicting future malware using the generative models, training a classifier using the future malware predicted from the generative models, using the classifier to detect malware, and other such tasks by executing software instructions on a processor, and through use of associated hardware.

Figure 5:
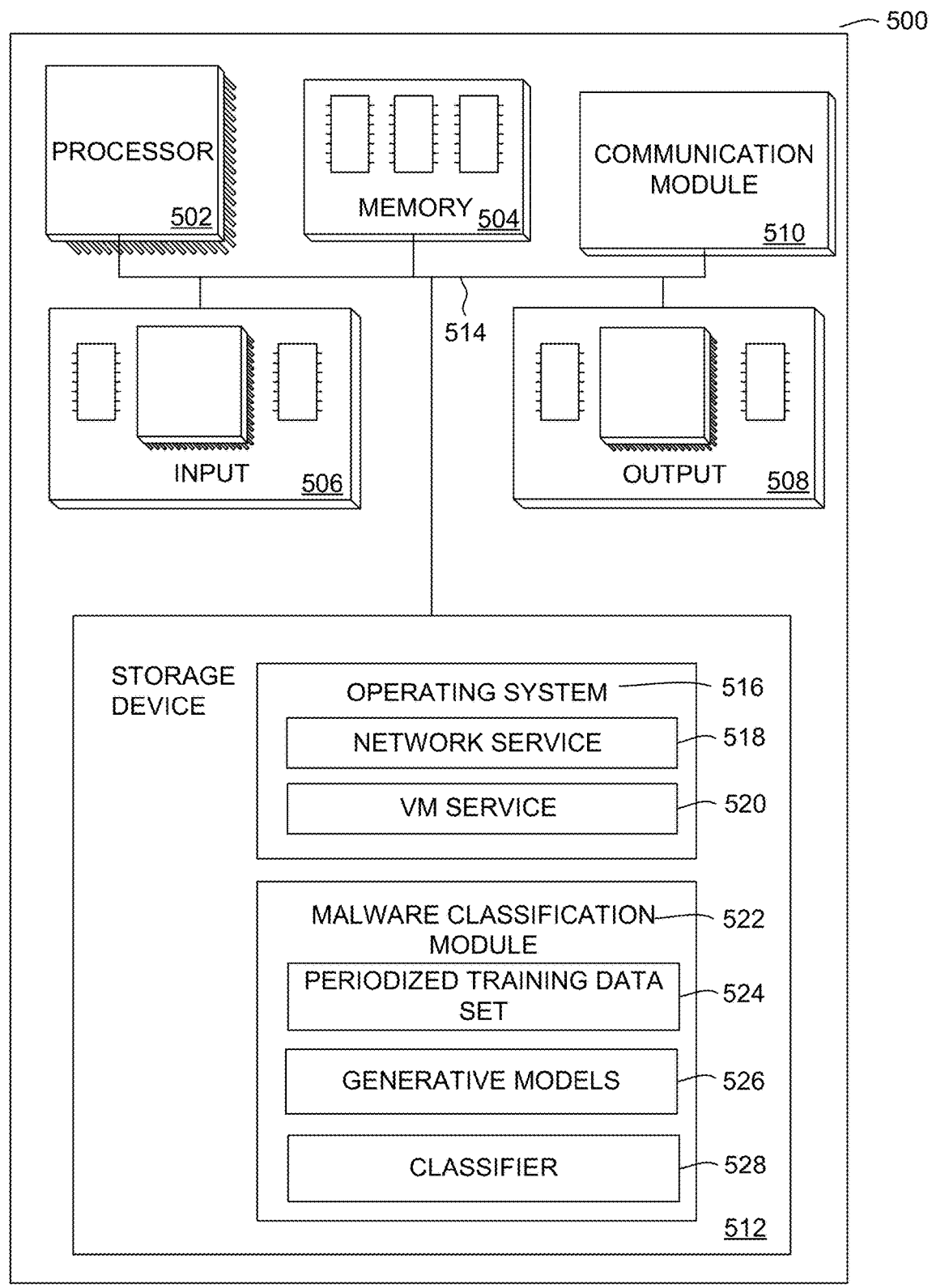
FIG. 5 is an example computerized malware detection and classification system.

FIG. 5 is one example of such a computerized malware detection and classification system. FIG. 5 illustrates only one particular example of computing device 500, and other computing devices 500 may be used in other embodiments. Although computing device 500 is shown as a standalone computing device, computing device 500 may be any component or system that includes one or more processors or another suitable computing environment for executing software instructions in other examples, and need not include all of the elements shown here.

As shown in the specific example of FIG. 5, computing device 500 includes one or more processors 502, memory 504, one or more input devices 506, one or more output devices 508, one or more communication modules 510, and one or more storage devices 512. Computing device 500 in one example further includes an operating system 516 executable by computing device 500. The operating system includes in various examples services such as a network service 518 and a virtual machine service 520 such as a virtual server or virtualized honeypot device. One or more applications, such as malware classification module 522 are also stored on storage device 512, and are executable by computing device 500.

Each of components 502, 504, 506, 508, 510, and 512 may be interconnected (physically, communicatively, and/or operatively) for inter-component communications, such as via one or more communications channels 514. In some examples, communication channels 514 include a system bus, network connection, inter-processor communication network, or any other channel for communicating data. Applications such as malware classification module 522 and operating system 516 may also communicate information with one another as well as with other components in computing device 500.

Processors 502, in one example, are configured to implement functionality and/or process instructions for execution within computing device 500. For example, processors 502 may be capable of processing instructions stored in storage device 512 or memory 504. Examples of processors 502 include any one or more of a microprocessor, a controller, a digital signal processor (DSP), an application specific integrated circuit (ASIC), a field-programmable gate array (FPGA), or similar discrete or integrated logic circuitry.

One or more storage devices 512 may be configured to store information within computing device 500 during operation. Storage device 512, in some examples, is known as a computer-readable storage medium. In some examples, storage device 412 comprises temporary memory, meaning that a primary purpose of storage device 512 is not long-term storage. Storage device 512 in some examples is a volatile memory, meaning that storage device 512 does not maintain stored contents when computing device 500 is turned off. In other examples, data is loaded from storage device 512 into memory 504 during operation. Examples of volatile memories include random access memories (RAM), dynamic random access memories (DRAM), static random access memories (SRAM), and other forms of volatile memories known in the art. In some examples, storage device 512 is used to store program instructions for execution by processors 502. Storage device 512 and memory 504, in various examples, are used by software or applications running on computing device 500 such as malware classification module 522 to temporarily store information during program execution.

Storage device 512, in some examples, includes one or more computer-readable storage media that may be configured to store larger amounts of information than volatile memory. Storage device 512 may further be configured for long-term storage of information. In some examples, storage devices 512 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication modules 510. Computing device 500 in one example uses communication module 510 to communicate with external devices via one or more networks, such as one or more wireless networks. Communication module 510 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 500 uses communication module 510 to wirelessly communicate with an external device such as via public network 122 of FIG. 1.

Computing device 500 also includes in one example one or more input devices 506. Input device 506, in some examples, is configured to receive input from a user through tactile, audio, or video input. Examples of input device 506 include a touchscreen display, a mouse, a keyboard, a voice-responsive system, a video camera, a microphone, or any other type of device for detecting input from a user.

One or more output devices 508 may also be included in computing device 500. Output device 508, in some examples, is configured to provide output to a user using tactile, audio, or video stimuli. Output device 508, in one example, includes a display, a sound card, a video graphics adapter card, or any other type of device for converting a signal into an appropriate form understandable to humans or machines. Additional examples of output device 508 include a speaker, a light-emitting diode (LED) display, a liquid crystal display (LCD), or any other type of device that can generate output to a user.

Computing device 500 may include operating system 516. Operating system 516, in some examples, controls the operation of components of computing device 500, and provides an interface from various applications such as malware classification module 522 to components of computing device 500. For example, operating system 516, in one example, facilitates the communication of various applications such as malware classification module 522 with processors 502, communication unit 510, storage device 512, input device 506, and output device 508. Applications such as malware classification module 522 may include program instructions and/or data that are executable by computing device 500. As one example, malware classification module 522 uses periodized training set 524 to create generative models 526 that are trained to predict future malware from a time series of recent malware. The generative models are then used to predict future malware that can be used to train classifier 528, improving its ability to detect new malware as malware evolves over time. These and other program instructions or modules may include instructions that cause computing device 500 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of operating a malware evaluation system, comprising:
    training a first machine-learning model using observed malware from a first set of distinct prior time periods to predict malware in a first subsequent time period subsequent to the first set of prior time periods,
    training at least a second machine-learning model based on observed malware from a second set of distinct prior time periods offset in time from and non-overlapping with the first set of prior time periods used to train the first machine-learning model, the second machine-learning model trained to predict malware in a second subsequent time period subsequent to the second set of prior time periods; and
    applying the trained first and at least second machine-learning models to a training set of data to generate a set of predicted future malware; and
        concurrently training a classifier, using the observed malware from a first set of time periods, the observed malware from a second set of time periods, and the set of predicted future malware, the classifier operable to detect both known malware and malware not previously observed in any of the prior time periods.

2. The malware evaluation system of claim 1, further comprising deploying the trained classifier to an anti-malware module operable to detect known and predicted malware and to alert a user of the detected malware.

3. The malware evaluation system of claim 1, wherein the classifier is trained using both prior malware and subsequent malware predicted by the trained first and at least second machine-learning models.

4. The malware evaluation system of claim 1, wherein the classifier comprises a neural network.

5. The malware evaluation system of claim 1, wherein the first and at least second machine learning models are generative machine learning models.

6. The malware evaluation system of claim 5, wherein the generative machine learning models are conditional cyclic generative adversarial networks (CCyGAN).

7. The malware evaluation system of claim 5, wherein the generative machine learning model is trained on static features of the malware from the prior time periods.

8. The malware evaluation system of claim 5, wherein the generative machine learning model is trained on behavioral analysis of the malware from the prior time periods.

9. A method of detecting future malware, comprising:
    executing a trained malware classifier in a malware evaluation system to identify malware, the trained malware classifier trained to identify both known malware and malware not previously observed in any of the prior time periods using a set of predicted future malware derived from at least first and second machine-learning models, the first machine-learning model trained using observed malware from a first set of prior time periods to predict malware in a first time period subsequent to the first set of prior time periods and the second machine-learning model trained using observed malware from a second set of distinct prior time periods offset in time from and non-overlapping with the first set of prior time periods used to train the first machine-learning model, the second machine-learning model trained to predict malware in a second subsequent time period subsequent to the second set of prior time periods;
    applying the trained first and at least second machine-learning models to a training set of data to generate a set of predicted future malware, and training a classifier, using the observed malware from a first set of time periods, the observed malware from a second set of time periods, and the set of predicted future malware, the classifier operable to detect both known malware and malware not previously observed in any of the prior time periods; and
    alerting a user of malware identified by the malware evaluation system's classifier.

10. The method of detecting future malware of claim 9, wherein the first and at least second machine-learning models are generative machine learning models.

11. The method of detecting future malware of claim 9, wherein the classifier comprises a neural network.

12. The method of detecting future malware of claim 9, wherein the classifier is trained using both prior malware and malware predicted by the trained first and at least second machine-learning models.

13. The method of detecting future malware of claim 9, wherein the first and second machine-learning modules are trained on at least one of static features of the malware from the prior time periods and behavioral analysis of the malware from the prior time periods.

14. An information handling system, comprising:
    a memory;
    a processor operable to execute program instructions stored in the memory; and
    program instructions comprising:
        a first machine-learning model trained using observed malware from a first set of prior time periods to predict malware in a first subsequent time period subsequent to the first set of distinct prior time periods, and
        at least a second machine-learning model trained using observed malware from a second set of distinct prior time periods offset in time from and non-overlapping with the first set of time periods used to train the first machine-learning model, the second machine-learning model trained to predict malware in a second subsequent time period subsequent to the second set of prior time periods;
        wherein the trained first and at least second machine-learning models are applied to a training set of data to generate a set of predicted future malware and concurrently training a classifier, using the observed malware from a first set of time periods, the observed malware from a second set of time periods, and the set of predicted future malware, the classifier operable to detect both known malware and malware not previously observed in any of the prior time periods.

15. The information handling system of claim 14, wherein the classifier is executed on at least one other information handling system and is operable to detect known and predicted malware and to alert a user of the detected malware.

16. The information handling system of claim 14, wherein the classifier is trained using both prior malware and malware predicted by the trained first and second machine-learning models.

17. The information handling system of claim 14, wherein the first and second machine learning models are generative machine learning models.

* * * * *